March 26, 1929.  J. D. CASEY  1,706,651
EXTENSION BOLT
Filed March 26, 1928
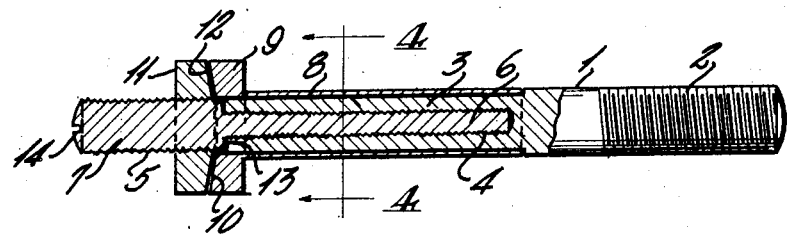
Fig.1
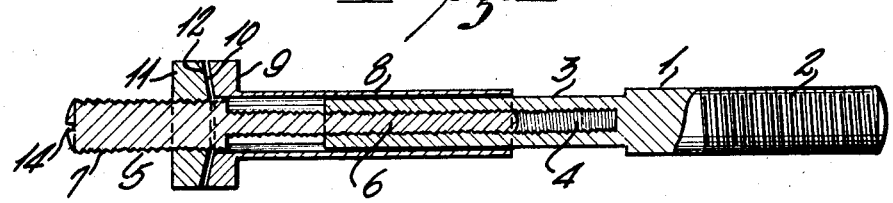
Fig.2
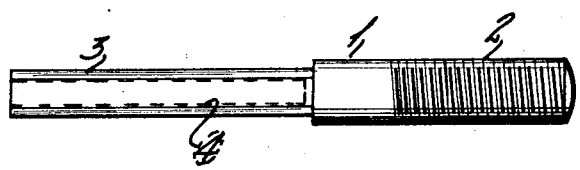
Fig.3
 
Fig.4  Fig.5
Inventor
James D. Casey.
By Adam E. Fisher.
Attorney Patented Mar. 26, 1929.

1,706,651

UNITED STATES PATENT OFFICE.

JAMES D. CASEY, OF GLENWOOD, ALABAMA.

EXTENSION BOLT.

Application filed March 26, 1928. Serial No. 264,760.

This invention relates to extension bolts, and has as its main object to provide a bolt which may be readily varied in length so as to accommodate itself for use upon structures and members of varying dimensions.

Another object is to provide a bolt which is simple and strong in construction and which may be conveniently mounted upon a structure and locked in place thereon.

With the foregoing and other objects in view, the invention resides in the peculiar construction and arrangement of the several parts as hereinafter set forth and claimed.

In the drawing

Figure 1 is a side view partly in section, of a bolt constructed in accordance with my invention, the same being shown in the telescoped or retracted position;

Figure 2 is a side view, partly in section, of the bolt in the extended position;

Figure 3 is a side view of the main body portion of the bolt;

Figure 4 is a section along the line 4—4 in Figure 1;

Figure 5 is a side view of the stud as removed from the bolt.

In carrying out my invention, I provide the body portion 1 having the exteriorly threaded end 2 and the reduced shank 3 with a threaded socket or bore 4. The shank 3 is relatively smaller than the threaded end 2 and is preferably hexagonal in cross section as shown in Figure 4. The stud 5 has an externally threaded stem portion 6 adapted to threadedly engage the socket 4 and has the relatively enlarged externally threaded nut receiving end portion 7. A sleeve 8 is slidably mounted over the shank 3, being hexagonal in cross section to conform therewith, and is provided with an enlarged end plate 9 with the concave or dished face 10. The end plate 9 is preferably square or hexagonal in shape to conform with the nut 11 threadedly engaging the nut receiving end 7 of the stud 5 and having a complementary, convex face 12 adapted to contact the dished face 10.

In the use and operation of the device, the stud 5 has its threaded stem 6 inserted in the socket 4 until the enlarged end portion 7 and the end of the shank 3 contact as indicated at 13, a screw driver slot 14 being provided to facilitate this operation. The sleeve 8 is placed over the shank 3 and the nut 11 is drawn up into engagement with the end plate 9. The bolt may then be put in place within the bolt aperture and locked in any convenient manner or by a nut (not shown) engaging the threaded end 2 of the body portion 1.

When it is desired to extend the bolt, the nut 11 is removed and the stud 5 is unscrewed from within the socket 4 the distance which the bolt is to be extended. The sleeve 8 is slid outward upon the shank 3 as shown in Figure 2 and the nut 11 replaced so that the bolt is again secured in place.

It will be understood that the bolt may be extended substantially the length of the threaded stem 6 of the stud 5. The sleeve 8 and shank 3, being hexagonal in cross section as pointed out, will prevent any turning of the bolt when extending the same, and if necessary, the end plate 9 may be held in a wrench (not shown) when removing the stud 5. The complementary dished faces 10 and 12 of the end plate 9 and nut 11 allow the said nut 11 to have a longer threaded stud engaging portion and strengthen the bolt.

While I have herein set forth a preferred embodiment of my invention, it is understood that I may vary from the same in minor details, not departing from the spirit of the invention and within the scope of the appended claim.

I claim:

In an extension bolt, a body portion provided with a threaded nut receiving end and a relatively smaller shank hexagonal in cross section having a threaded longitudinal socket therein, a stud having an externally threaded stem adapted to engage said socket and having a relatively enlarged externally threaded nut receiving end portion provided with a screw driver slot, a sleeve hexagonal in cross section adapted to slidingly engage the shank of the said body portion, the same having an enlarged end plate with a concavely dished face, a nut adapted to threadedly engage the said enlarged end portion of the stud and having a complementary convexly dished face to contact with the said end plate and secure the elements in position.

In testimony whereof I affix my signature.

JAMES D. CASEY.